(12) United States Patent
Baugh

(10) Patent No.: US 8,931,203 B2
(45) Date of Patent: Jan. 13, 2015

(54) UNIVERSAL SYSTEM FOR HOLDING FISHING RODS

(71) Applicant: Karol R Baugh, Three Lakes, WI (US)

(72) Inventor: Karol R Baugh, Three Lakes, WI (US)

(73) Assignee: KBaugh Blue LLC, Three Lakes, WI (US)

( * ) Notice: Subject to any disclaimer, the term of this patent is extended or adjusted under 35 U.S.C. 154(b) by 0 days.

(21) Appl. No.: 13/888,026

(22) Filed: May 6, 2013

(65) Prior Publication Data

US 2014/0290115 A1 Oct. 2, 2014

Related U.S. Application Data

(63) Continuation of application No. 13/854,912, filed on Apr. 1, 2013, now abandoned.

(60) Provisional application No. 61/618,458, filed on Mar. 30, 2012.

(51) Int. Cl.
*A01K 91/06* (2006.01)
*A01K 97/11* (2006.01)
*A01K 97/10* (2006.01)
*A01K 97/01* (2006.01)

(52) U.S. Cl.
CPC ............ *A01K 97/01* (2013.01); *A01K 97/11* (2013.01); *A01K 97/10* (2013.01)
USPC .................................. 43/15; 43/4.5; 43/54.1

(58) Field of Classification Search
USPC .......... 43/15–17, 21.1; 211/70.8; 206/315.11; D22/147
See application file for complete search history.

(56) References Cited

U.S. PATENT DOCUMENTS

| 3,060,616 | A | * | 10/1962 | Woodley | 43/17 |
| 4,161,839 | A | * | 7/1979 | Ward | 43/17 |
| 4,397,113 | A | * | 8/1983 | Pinson | 43/15 |
| 4,620,387 | A | * | 11/1986 | Bloom | 43/17 |
| 4,642,930 | A | * | 2/1987 | Graf | 43/19.2 |
| 4,829,697 | A | * | 5/1989 | Nakata | 43/17 |
| 4,837,965 | A | * | 6/1989 | True | 43/17 |
| 5,778,592 | A | * | 7/1998 | Malmberg | 43/21.2 |
| 5,987,801 | A | * | 11/1999 | Anderson | 43/17 |
| 5,992,080 | A | * | 11/1999 | Allen | 43/19.2 |
| 6,021,596 | A | * | 2/2000 | Heuke | 43/19.2 |
| 6,079,142 | A | * | 6/2000 | Danser et al. | 43/17 |
| 6,463,691 | B1 | * | 10/2002 | Atkins | 43/17 |
| 6,594,941 | B1 | * | 7/2003 | Anderson | 43/17 |
| 6,622,421 | B1 | * | 9/2003 | Daniels | 43/4.5 |
| 6,817,136 | B2 | * | 11/2004 | Novak | 43/19.2 |

(Continued)

*Primary Examiner* — Kimberly Berona
*Assistant Examiner* — Marc Burgess
(74) *Attorney, Agent, or Firm* — Fantastic IP Consulting; Eduardo E. Drake

(57) ABSTRACT

To provide a better experience for ice fisherman and fisherman generally, the present inventor devised, among other things, apparatus, assemblies, components, and methods for holding a fishing device, such as a fishing rod. One exemplary apparatus includes an adjustable rod holder pivotably mounted or coupled to a base structure. The rod holder, which can be strapped or otherwise attached to one or more types of fishing rods or poles, has an adjustable center of gravity and/or an adjustable pivot point. The adjustable center of gravity and/or pivot point allows users to balance the fishing rod at various tip angles, up or down, and thus to position the rod in a way most suitable for the type of desired fish. The exemplary apparatus is particularly suitable as a replacement for the conventional tip-ups used in ice fishing, because it provides advantages of conventional rod & reel fishing with those of conventional tip-down fishing.

14 Claims, 4 Drawing Sheets

(56) References Cited

U.S. PATENT DOCUMENTS

| | | | |
|---|---|---|---|
| 6,862,835 B1 * | 3/2005 | Connors et al. | 43/21.2 |
| D659,223 S * | 5/2012 | Lefgren et al. | D22/147 |
| 8,276,310 B1 * | 10/2012 | Weber | 43/21.2 |
| 8,453,372 B1 * | 6/2013 | Moe | 43/21.2 |
| 2008/0052981 A1 * | 3/2008 | Richardson | 43/17 |
| 2012/0131841 A1 * | 5/2012 | Galbraith | 43/16 |

* cited by examiner

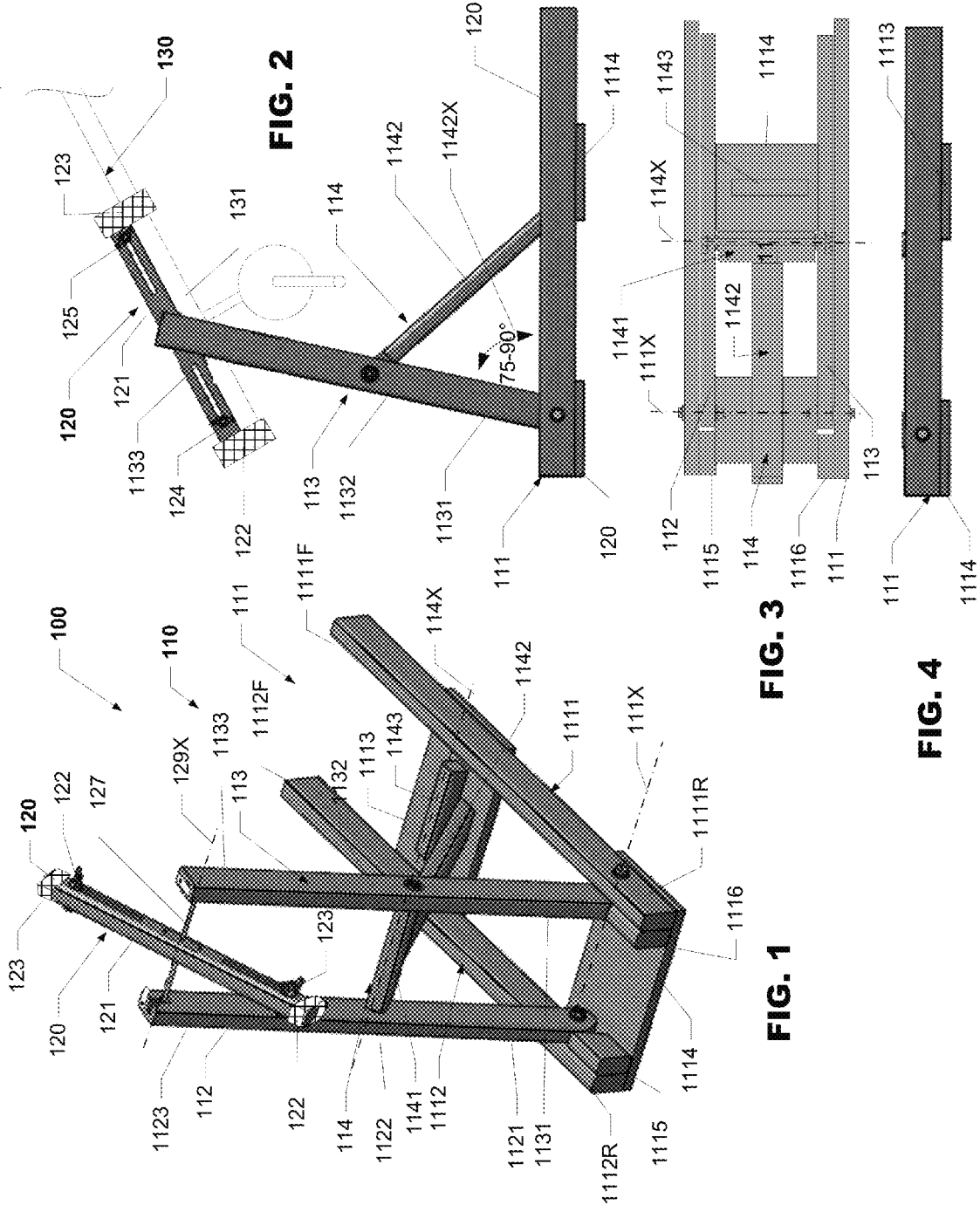

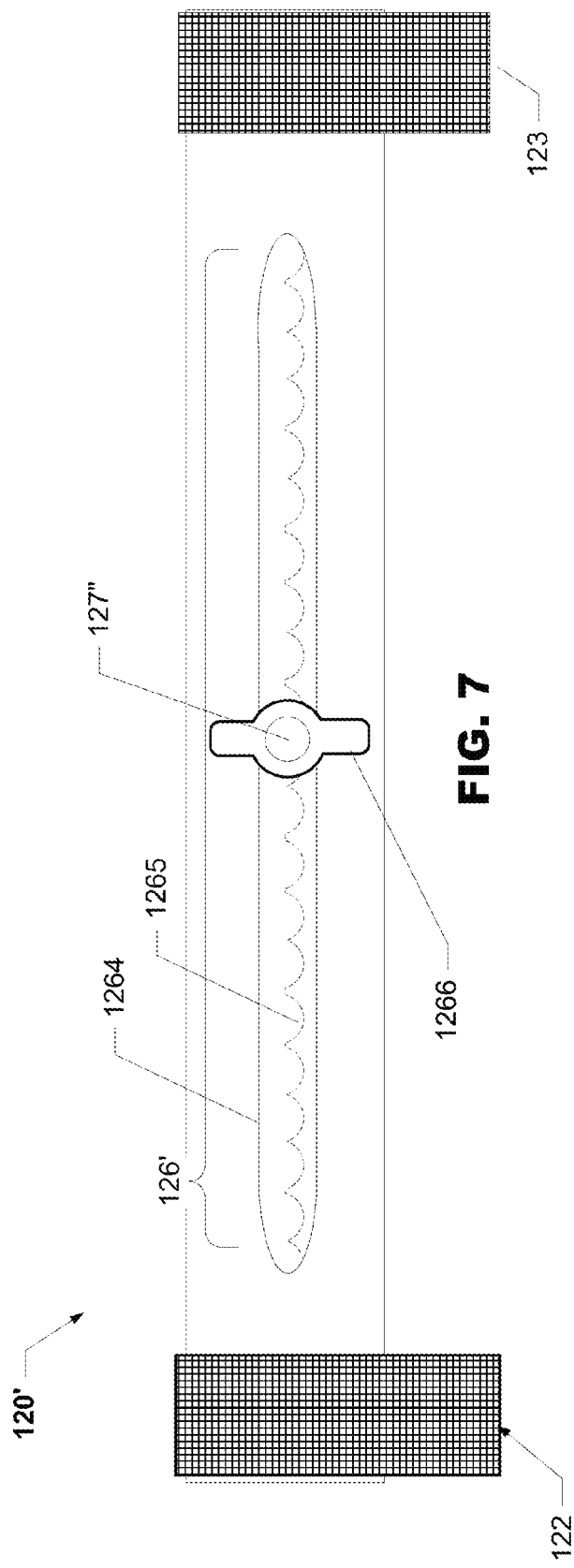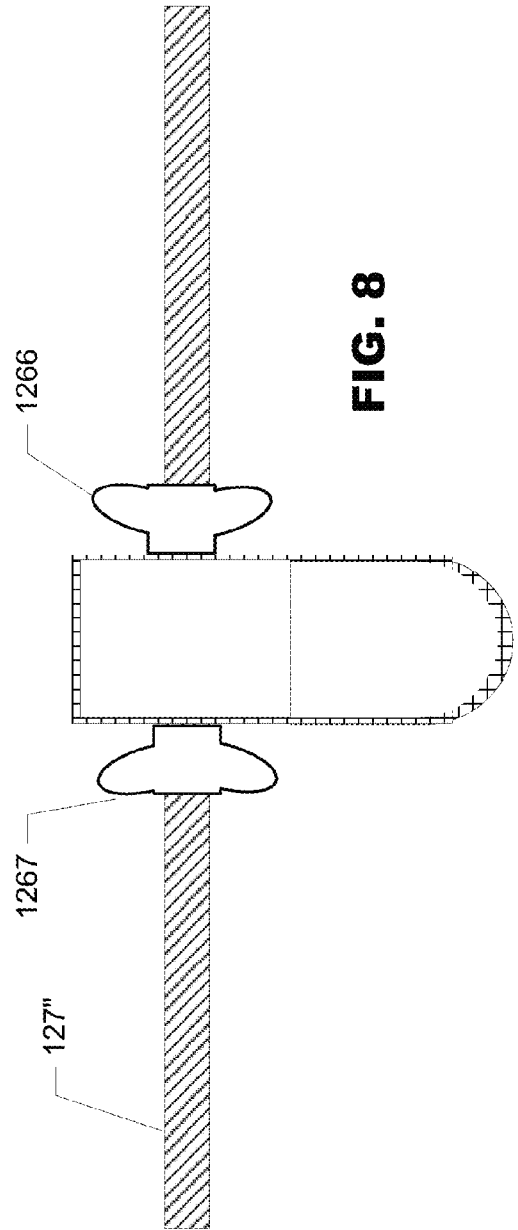

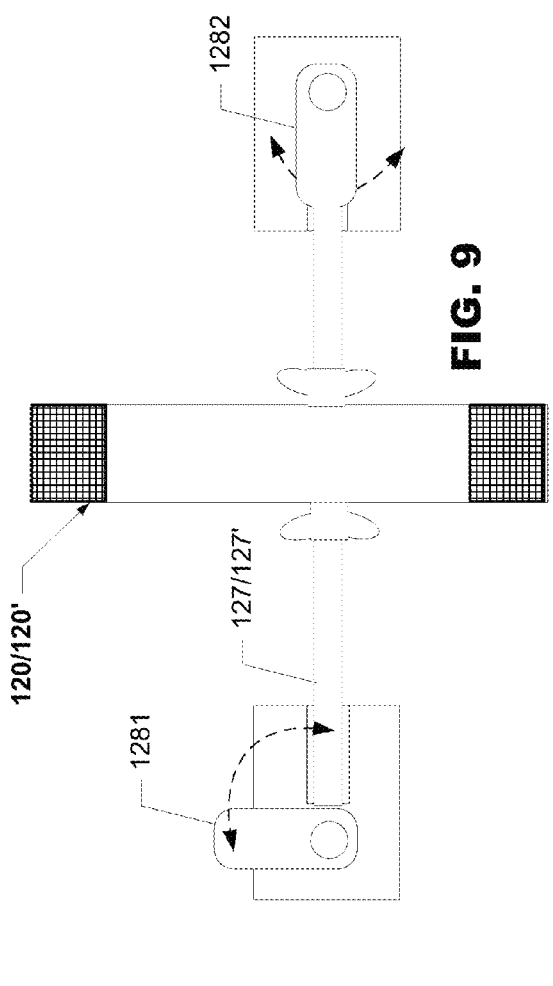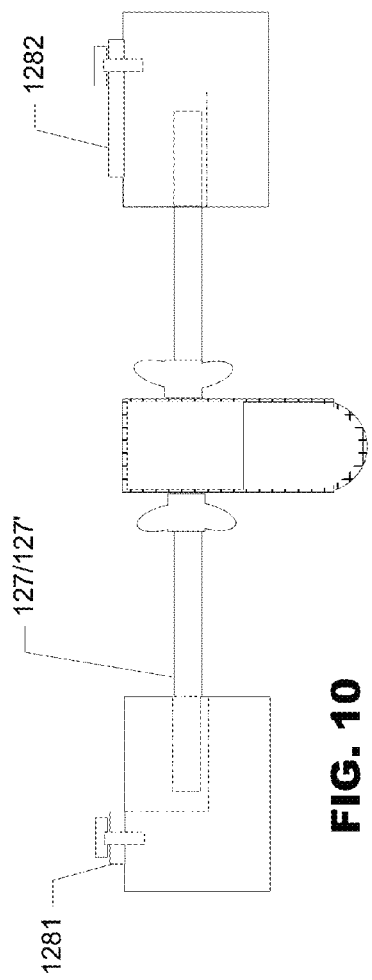

UNIVERSAL SYSTEM FOR HOLDING FISHING RODS

RELATED APPLICATION

The present application claims priority to U.S. Provisional Patent Application 61/618,458, which was filed on Mar. 30, 2012 and which is incorporated herein by reference in its entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright©2012 Karol R. Baugh

TECHNICAL FIELD

Various embodiments of the present invention related to systems, methods, and apparatus for holding fishing rods.

BACKGROUND

Fishing is one of the most popular recreational activities in the world. One of the most common ways to fish entails use of a fishing rod or pole that is attached to a fishing line with a baited hook. The fishing rod is typically held by a user as the line and hook are submerged in a lake, pond, river, or other body of water believed to contain fish. In northern winter climates, the lake or pond may be partially frozen, with users boring a hole through a thick layer of ice to access the water and fish below.

One problem the present inventor recognized in ice fishing concerns use of tip ups, which evolved to allow fishing without the need for holding a fishing rod. A tip-up is a spring-loaded fishing device that senses a fish strike (bite) on a fishing line and automatically jerks a portion of the upward while simultaneously raising a small flag to signal the strike. The device is very popular because it allows users to enjoy ice fishing while sitting in the comfort of warming houses, typically portable ones positioned on a frozen lake.

Unfortunately, tip-ups require users attempting to catch a fish to pull in their fishing line hand over hand, typically while kneeling on the ice or otherwise bending over. Moreover, tip-ups are not suitable for catching fish, such as crappy and walleye, that are sensitive to the line resistance imposed by these spring-loaded mechanisms. Indeed, tip-ups can frequently be triggered by such fish striking without getting hooked, forcing users to leave the comfort of their warming houses to reset their tip-ups without the reward of an actual catch.

Accordingly, the present inventor has identified a need to provide better ways of ice fishing.

SUMMARY

To address one or more of these and/or other needs, the present inventor devised, among other things, apparatus, assemblies, components, and methods for holding a fishing device. One exemplary apparatus includes an adjustable rod holder pivotably mounted or coupled to a base structure. The rod holder, which can be strapped or otherwise attached to one or more types of fishing rods or poles, has an adjustable center of gravity and/or an adjustable pivot point (or axis). The adjustable center of gravity and/or pivot point allows users to balance the fishing rod in a wide-range of positions, including at various tip-up and tip-down angles, and thus to position the rod in a way most suitable for the type of desired fish.

In the exemplary embodiment, the center of gravity is adjustable via the selective movement or repositioning of one or more weights along the length dimension generally or substantially perpendicular to a pivot axis of the rod holder. The pivot point can be adjusted generally in two ways: First, it can be in predefined increments via placement of a pivot rod or axle that mounts to the base structure through one of a set of two or more through-holes in the rod holder. Second, it can be adjusted continuously by placing the pivot rod through a pivot slot or slide and locking it in place using a mechanism for selectively securing the relative position of the pivot rod within the pivot slot. In some embodiments, the pivot slide or slot includes ridges or troughs that engage the pivot rod, allowing the user to move the pivot point incrementally and thus to adjust the tip angle of the rod incremental steps.

BRIEF DESCRIPTION OF THE DRAWINGS

This document incorporates the following listed figures to aid in describing the concepts, structures, functions, operations, and/or advantages of various embodiments of the present invention. The figures are annotated with numbers or other labels that are referenced in the text of the detailed description that follows. For simplicity and clarity, like reference numerals in the figures refer to identical or functionally similar elements. Additionally, some, if not all, elements in the figures may not only omit the detail of actual physical embodiments of the invention, but also may not have been drawn to scale. The depicted dimensions of some elements may be exaggerated relative to other elements to facilitate understanding.

FIG. 1 is a rear perspective view of an exemplary fishing rod or pole holding apparatus corresponding to one or more embodiments of the present invention.

FIG. 2, a profile view of the exemplary apparatus shown in FIG. 1, also corresponds to one or more embodiments of the present invention.

FIG. 3, a top view of the FIG. 1 apparatus in a folded or storage mode, also corresponds to one or more embodiments of the present invention.

FIG. 4, a side view of the FIG. 1 apparatus in the folded or storage mode, also corresponds to one or more embodiments of the present invention.

FIGS. 7 and 8 are respective side and end views of another exemplary adjustable rod holder assembly which can be used with the apparatus in FIG. 1 and which correspond to one or more embodiments of the present invention.

FIGS. 9 and 10, showing respective top and profile views of a slot closure portion of the exemplary FIG. 1 apparatus, corresponds to one or more embodiments of the present invention.

DETAILED DESCRIPTION OF EXEMPLARY EMBODIMENTS

Figure 5:
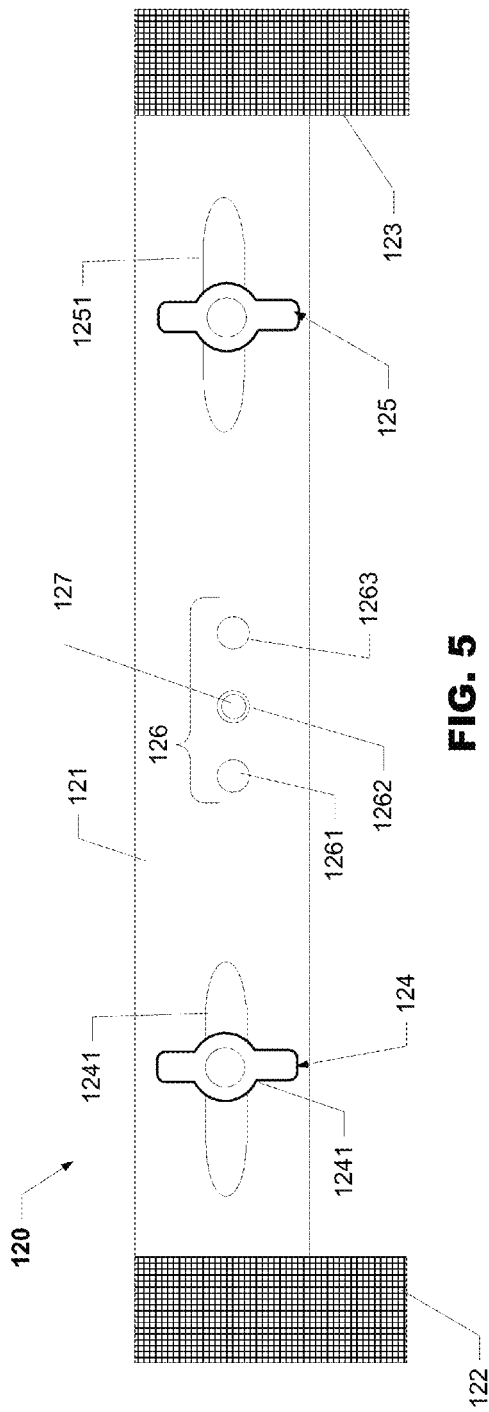
FIGS. 5 and 6 are respective side and end views of an exemplary adjustable rod holder assembly, which can be used with the apparatus in FIG. 1 and which corresponds to one or more embodiments of the present invention.

This document, which incorporates the drawings and the appended claims, describes one or more specific embodiments of one or more inventions.

These embodiments, offered not to limit but only to exemplify and teach various aspects of the invention, are shown and described in sufficient detail to enable persons skilled in the relevant art to make and use the invention. Thus, for sake of brevity and to avoid obscuring the invention, the description may omit certain information known to those of skill in the art.

FIGS. 1 and 2 show an exemplary rod holder apparatus 100 in an operational or normal usage mode, and FIGS. 3 and 4 show the apparatus in an inoperative folded or storage mode. Apparatus 100, which employs a tip-down balance mechanism, includes three main parts: a base frame or support frame 110, an adjustable rod holder assembly 120, and an optional fishing rod 130 (shown only in FIG. 2). In the exemplary embodiment, fishing rod 130 may almost any form, including fishing rods with attached spinning reels.

In overview, base frame 110 includes vertical support members or arms 112 and 113 which are held at a specific angle relative to a base portion 111 via an angle brace assembly 114. Adjustable rod holder 120 is pivotably and removably mounted via a pivot rod 127 to upper portions of the vertical support members. A handle portion 131 of fishing rod 130 is strapped or otherwise removably and securely mounted to the rod holder assembly, enabling the rod to pivot about an axis 127X defined by pivot rod or axel 127. In the exemplary embodiment, the rod holder 120 has an adjustable center of gravity and an adjustable pivot point (or axel-through position). Its center of gravity is adjustable via the selective movement or repositioning of weight assemblies 124 and 125 along its length dimension, i.e, a dimension generally or substantially perpendicular to axis 127X. The rod holder pivot point can be adjusted via placement of the pivot rod through one of a set of two or more through-holes in the rod holder or via use of a pivot slot in the rod holder along with means for selectively securing the relative position of the pivot rod within the pivot slot.

More particularly, base frame 110, which takes the exemplary form of a wooden rectangular foldable frame, including a base portion 111, two generally vertical support members 112 and 113, and an angle brace assembly 114.

Base portion 111 includes respective left and right side members 1111 and 1112 and respective front and rear cross members 1113 and 1114. Left and right side members 1111 and 1112, which are generally parallel to each other and have the same nominal dimensions, have respective front portions 1111F and 1112F and respective rear portions 1111R and 1112R. Front portions 1111F and 1112F are held in fixed relationship to each other via front cross member 1113, and rear portions 1111R and 1112R are similarly held via rear cross member 1114. Rear portions 1111R and 1112R are pivotably mounted via conventional fasteners, such as a nut-bolt-and-washer assembly, to respective lower end portions 1121 and 1131 of vertical support members 112 and 113, permitting their rotation about an axis 111X (defined by the fasteners or (not labeled). Also included are angled stop blocks 1115 and 1116 to stop over-rotation of the vertical support members away from base portion 111. The exemplary embodiment stops rotation of the vertical supports at an angle of approximately 75 degrees from horizontal (from base portion 111); however other embodiments provide an angle of in the range of 85-90 degrees.

Vertical support members 112 and 113, which are generally parallel to each other and have the same nominal dimensions, also include respective intermediate or middle portions 1122 and 1132 and respective upper portions 1123 and 1133. Intermediate portions 1122 and 1123 are pivotably coupled to cross member portion 1141 of angle brace assembly 114.

Angle brace assembly 114 includes not only cross member portion 1141 but also a brace leg 1142, and a brace stop member 1143. Cross member portion 1141, which is positioned between vertical support members 112 and 113, has a left end pivotably coupled, for example bolted, to intermediate portion 1122, and a right end pivotably coupled to intermediate portion 1132. Although any pivotable coupling or mounting arrangement can be used, the exemplary embodiment feeds an axle with threaded ends through a bore in the cross member or two headless bolts threaded into the respective ends of the cross member to define a rotational axis 114X. The threaded ends of the axle or the headless bolts extend through countersunk holes in intermediate portions 1122 and 1132 of vertical support members 112 and 113. (The holes are countersunk to receive lock nuts and washers and provide clearance for the vertical support members to rotate about axis 111X between base frame side members 1111 and 1112.)

Brace leg 1142 extends generally perpendicularly from cross member portion 1141. In the exemplary embodiment, which is formed of wood, brace leg 1142 is fastened to cross member portion 1141 via a mortise-and-tenon joint. A lower end portion 1142A of brace leg 1142 is angled or beveled to rest flush on a top surface of front cross member 1113 and to engage brace stop member 1143. Brace stop member 1143, in the exemplary embodiment, takes the form of a rectangular block fixedly mounted to the top surface of front cross member 1113. (In some embodiments, the stop member takes the form of an indentation, recess, or opening in the surface of cross member 1113, and in others it takes the form of either a hook or loop cloth patch, with the end of the brace leg having the counterpart loop or hook cloth patch. Some embodiments may attach a metal plate or several nails or screws into the end of the brace leg and embed or fasten a magnet to cross member 1113.) The length of the brace leg and position of brace stop member 1143 define a base frame support angle 1142X (best shown in FIG. 2), the angle of base portion 111 relative to vertical support members 112 and 113.

Figure 6:
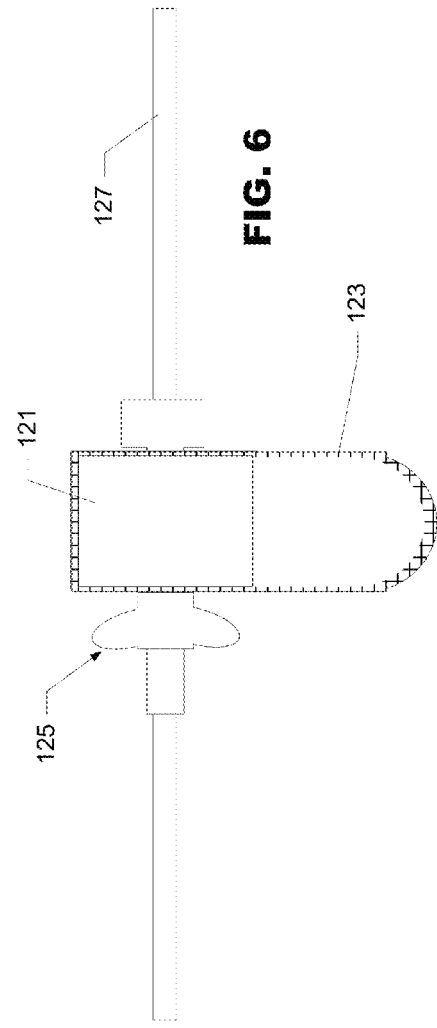

Pivotably coupled to the upper portions 1123 and 1133 of the vertical support members is adjustable rod holder assembly 120, best shown in FIGS. 2, 5, and 6.

Rod holder assembly 120 includes an elongated body 121, rod retainer members 122 and 123, a center-of-gravity (or weight distribution) adjustments 124 and 125, adjustable pivot portion 126, and a pivot rod 127. Body 121, in the exemplary embodiment, takes the form of an elongated 1 inch×0.75 inch wooden bar having first and second end portions 121A and 121B, which define a body length. In the exemplary embodiment, body length is in the range of 8 to 18 inches (20.3-45.7 cm), for example 12 inches (30.4 cm). Mounted to respective end portions 121A and 121B of the body portion are rod retainer members 122 and 123.

In the exemplary embodiment, rod retainer members 122 and 123 take the form of VELCRO™ hook-and-loop strap, with a loop-cloth strip encircling each of the end portions and a 5-6-inch (12.7-15.7 cm) long strap of hook cloth attached to the loop cloth. The length of strap is chosen to enable securely strapping the handle portion of a fishing rod, pole, or other fishing device to body portion 121, generally configuring or orienting the body portion to be in a parallel relationship with the handle portion of the fishing rod (shown for example in FIG. 2). Adjacent end portions 122 and 123 are slot or slide portions 1241 and 1251 (shown in FIG. 5) of center-of-gravity (or weight distribution) adjustments 124 and 125.

Adjustments 124 and 125 also includes repositionable weight members 1242 and 1252 which respectively extend through slot or slide portions 1241 and 1251. The slot or slide portions are oriented with their length dimensions generally parallel to the length or longitudinal dimension of body portion 121. In the exemplary embodiments, each of weight members 1242 and 1252 take the form of a nut-and-bolt assembly, with the bolt extending through its corresponding slot or slide portion and a nut (for example a wingnut) that threads onto the bolt. The wingnut can be loosened to permit sliding the longitudinally along the length of the body portion, shifting the center of gravity of the adjustable rod holder. More acute center-of-gravity adjustments can be achieved by adding washers, to weight members 1242 and 1252 and/or by lengthening the body or slot or slide portions 1241 and 1251 of the adjustable rod holder. (In some embodiments, the body portion, for example, can take the form of a telescoping structure which allows further adjustment.) Located between weight adjustments 124 and 125 is adjustable pivot portion 126.

In the exemplary embodiment, adjustable pivot portion 126 includes a set of set of two or more through-holes, for example through-holes 1261, 1262, and 1263, with through-hole 1261 positioned at a midpoint along the length of body portion 121, and through-holes 1262 and 1263 equally spaced from and an positioned on either side of through-hole 1261. Pivot rod 127, a metallic cynlindrical rod extends through one of the through-holes, thereby defining that through-hole as the pivot point for the pivotably mounted rod holder assembly.

FIGS. 7 and 8 show respective side and end views of alternative rod holder assembly 120' which can be substituted for the rod holder assembly 120. Notably, assembly 120' omits weight distribution adjustments 124 and 125, and replaces pivot adjustment 126 with pivot adjustment 126" and pivot rod 127 with a threaded pivot rod 127'. Adjustment of the pivot point for rod holder assembly 120' is achieved by loosening one of windnuts 1266 or 1267 that are threaded onto pivot rod 127', and sliding pivot rod 127' longitudinally forward or backward along pivot slot or opening 126'. When the desired tip angle is achieved (assuming attachment of a fishing rod to the rod holder assembly), the wingnut is tightened, thereby fixing position of the pivot rod relative to the body of the rod holder assembly. Pivot slot or opening 126' can have a smooth profile to permit continuous adjustment of the pivot point along the length of the slot, and/or it can include troughs or grooves, as shown via profile line 1265 that define a series of incremental pivot point positions. The profile of the slot and groove spacing can be laser or CNC-machine cut into a block of wood or other material, or molded using conventional techniques. Some embodiments add similar profiles to the slots for weight distribution adjustments 124 and 125.

In operation, the exemplary apparatus, specifically rod holder assembly 120 and/or 120', provides one or more ways to balance a fishing rod at a desired tip angle:

1) selection of the pivot point (via pivot hole selection or continuous or discreet pivot point selection;
2) position of the rod holder assembly along the length dimension of the fishing rod; and/or
3) adjustment of the weight distribution of the rod holder assembly by moving, for example sliding, one or more of the weights (bolt and wing nut) forward or backward along the length dimension of the rod holder assembly.

More specifically, the exemplary apparatus provides several ways to fine tune the tip angle with any fishing rods that can be mounted to an appropriately scaled (sized) version of the apparatus. To this end, normal operation of the apparatus entails a user attaching the adjustable rod holder (aka "balance stick") using the rod retaining members, for example VELCRO straps, slightly forward of the reel of the fishing rod, with one strap behind the fishing reel and the other in front of it. After attachment of the fishing rod to the balance stick, the user selects a pivot point, for example via insertion of the pivot rod through one of the pivot holes or through sliding of the pivot rod along the pivot slot to a desired location and securing it in place with a wingnut tightening or through use of an alternative securing mechanism (for example spring biased clamping mechanism. A middle positioned pivot point is generally a believed to be a good starting point. For embodiments that include the adjustable weight distribution feature, the user can adjust position of one or more of the weights, adjusting the center of gravity of the balance stick forward or backward relative to the center of the stick. Additional weights in the form of washers can be added.

The rod holder assembly can then be mounted on the upper portion of the vertical support members, specifically by placing the ends of the pivots rods into corresponding slots in the ends of the vertical support members. FIGS. 1, 9 and 10 shows these slots as well as retainer tabs 1281 and 1282 that pivotably attached to the tops of the vertical support members. The tabs can be rotated to cover or uncover the slot openings in the vertical support members. In the covered position with the pivot rod installed in the slots, the retainer tabs prevent the pivot rod from escaping the slot, for example if the base support frame is tipped or flipped over. Some embodiments may use an L-shaped slot, with the L lower portion of the L directed toward the front (i.e. in the direction of the rod tip.

When the combined fishing rod and rod holder assembly are pivotally mounted to the base frame, the user can set the depth, perhaps with a line stop of some kind, bait the hook and start fishing. The exemplary embodiment allows the rod to actually bob freely up and down on its own as the minnow or other bait moves freely. With the exception of actually baiting the hook and possibly removing the fish from the hook, the process of setting up and packing up at the end of the day can mostly be done without removing gloves.

Moreover, as FIGS. 3 and 4 show the exemplary apparatus, specifically base frame 110 folds flat after removal of the rod holder assembly. In the exemplary embodiment, the rod holder assembly must be removed to permit fold down of the base frame. In some embodiments, the base frame includes a magnet mounted to an interior portion of one or both of the vertical support members, which can be used to hold the metal pivot rod and/or the rod holder assembly. Additionally some embodiments include additional retainer tabs on the side portions of the base frame which can be pivoted inward to prevent inadvertent unfolding or opening of the base frame. In some embodiments, magnetic fasteners are used to maintain the frame in a closed or folded position. In some embodiments, the body of rod holder assembly includes a longitudinal end bore with a retainer tab cover for storage of the 0.125-inch diameter×5.25 inch retaining rod.

The exemplary apparatus or system also facilitates use of open water rods and reels as well as traditional shorter rods with reels or jig poles for ice fishing. The system, particularly its elevated pivot point, eliminates the need for anglers to remove gloves and crawl around the ice, not only resulting in a warmer, more comfortable ice fishing experience, but also enabling them to spend more time catching fish.

The exemplary system enables ice fisherman to fish pan fish and game fish with conventional fishing tackle. One can select the rod length and action to match the reel size and the strength of the fishing line. Fishing entails securing the rod to a "balance stick" placing the pivot rod in a sturdy base. The system allows the fish to pull the rod forward to the level of the ice and still take line from a reel with a chosen drag adjustment. The rod cannot be pulled down the hole because of the attached base frame structure. The fish can be played in a normal manner, tiring the fish. The fishing rod can be used to land the fish rather than bringing it in hand over hand as required using a tip up.

EXEMPLARY ADVANTAGES

One or more of the exemplary embodiments provide one or more of the following advantages:
1. The "Balance Stick" quickly and easily attaches to almost any rod without using screws, turn screws, bolts or collars or any drastic rod modifications. There are no rod alterations necessary and most certainly no hole to drill in rod handle or reel seat. Nearly any fishing rod and reel including even a 10' bamboo pole with a reel can be quickly set up, and perfectly balanced, using the balance stick, and securely placed in a solid tip down rod holder ready to fish.
2. Set up and take down is fast, and it is easy to pull up and move from spot to spot and it is also convenient to pick up at the end of the day.
3. Fishing rods are safe from being pulled down the ice fishing hole because they are securely attached to the balance stick and a sturdy fixed base.
4. Allows early detection of a fish taking the bait, and fish can take out as much as 4-5 feet of line pulling the rod downward to the ice, until resistance is felt from the reels drag. It often happens that a fish will strip most of the line from a tip up and then drops the bait with the fisherman coming up empty handed. Using a rod and reel, as the exemplary apparatus permits, the fisherman may come up without a fish but not terribly inconvenienced.
5. Rod movement up and down usually last for some duration when the rod is well balanced in the "Balance Stick." This is often a desirable technique used to attract and stimulate fish to strike. This action can be turned on or turned off depending how the rod and reel are situated in the "Balance Stick".
6. Exemplary system is positioned completely positioned above the ice. No more kneeling or bending over the ice. (height of the pivot point is raised above the ice; some embodiments allow the height to be adjusted.) Rod activity and movement can be observed as well as any line being removed from the reel by a fish. Tip up fishing is done with the reel on the end of a shaft below the ice. When a tip up flag goes off the fisherman is aware of two things, either the shaft of the tip up is moving or it is motionless. (Some embodiments include passive or electronic audible or visual alarms that are triggered by movement or tilting of the rod, for example, a bell or chime.)
7. The fisherman can stand upright rather than kneel and crawl around the ice to set depths and bait the hook.
8. More fish are landed. Using a rod and reel is a better way to fish, setting the hook, playing the fish and landing the fish all are better. Hand-over-hand retrieval often results in the fish tearing the hook from its mouth.
9. When the fish is landed the extra line is reeled in, not curled and tangled on the snow and ice. Issues related to winding up frozen and tangled line are no longer a problem.

CONCLUSION

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. Apparatus for a fishing rod having a length dimension, the apparatus comprising:
a foldable support structure;
an elongated structure having a threaded pivot rod extending through a slot in the structure, the pivot rod adjustably positioned and locked to the structure at a position along a length dimension of the slot via first and second fasteners threaded onto the pivot rod on opposite sides of the elongated structure, wherein the pivot rod is pivotably and removably couplable to the foldable support structure so that the elongated structure and the pivot rod pivot in unison relative to the foldable support structure; and means for removably attaching the elongated structure to a fishing rod having an attached reel, wherein the means includes first and second straps attached respectively at opposing first and second ends of the elongated structure with the first strap configured for strapping the first end to a portion of the fishing rod forward of the reel and the second strap configured for strapping the second end to a portion of the fishing rod behind the reel, whereby the threaded pivot rod is selectively positioned and locked between the first and second straps.

2. The apparatus of claim 1, wherein at least one of the first and second fasteners is threadable in first and second opposite directions, whereby threading the fastener in the first direction locks the pivot rod into the position and threading the fastener in the second direction unlocks the pivot rod and allows adjusting its position within the slot.

3. The apparatus of claim 1, wherein the foldable support structure includes first and second vertical members, with each vertical member having a respective slot for pivotably supporting a respective end of the pivot rod.

4. The apparatus of claim 1, wherein each of the first and second straps includes a hook or loop material for respective hook-and-loop engagement with the first and second ends of the elongated structure.

5. Apparatus comprising:
an elongated component including a body having a length dimension and a pivot rod extending through the body at a first position along the length dimension; and
means for slidably adjusting position of the pivot rod from the first position to a second position along the length dimension and for locking the pivot rod to the body at the second position so that after locking the pivot rod and the elongated component can pivot in unison about an axis defined by the pivot rod; and
means for removably securing the elongated component to a fishing rod having an attached reel, wherein the means includes first and second straps attached respectively at opposing first and second ends of the elongated structure, with the first strap configured to strap the first end to a portion of the fishing rod forward of the reel and the second strap configured to strap the second end to a portion of the fishing rod behind the reel, whereby after the elongated component is removably secured via the straps to the fishing rod, the threaded pivot rod is adjustably positionable and lockable between the first and second straps without moving the elongated structure.

6. The apparatus of claim 5, wherein the elongated component has a nominal weight and a corresponding center of gravity, and wherein the component further comprises means for changing the center of gravity of the component without changing its nominal weight.

7. The apparatus of claim 5, wherein each of the first and second straps includes a hook or loop material for respective hook-and-loop engagement with the first and second ends of the elongated structure.

8. The apparatus of claim of 7 further comprising foldable support means for pivotably supporting the component when removably secured to the fishing rod.

9. The apparatus of claim 8, wherein the foldable support frame includes:
first and second generally vertical support members which are pivotably couplable to the component;
first and second generally horizontal base members pivotably mounted to the vertical support members; and
means for securing relative position of the vertical support members and the horizontal base members.

10. Apparatus for holding a fishing rod, comprising:
rod attachment means for attachment to a fishing rod having a reel, the rod attachment means including:
a body removably attachable to the top side of the fishing rod via first and second straps attached respectively at opposing first and second ends of the body, with the first strap configured to strap the first end to a portion of the fishing rod forward of the reel and the second strap configured to strap the second end to a portion of the fishing rod behind the reel, wherein the body has a length dimension generally parallel to that of the fishing rod after attachment and a width dimension generally perpendicular to the length dimension, with the length dimension being at least three times greater than the width dimension; and
pivot axis means for defining a pivot axis transverse to the length dimension; and
means for slidably adjusting and locking the pivot axis means to the body at a desired position along the length dimension so that after locking the pivot axis means and the body can pivot in unison about the pivot axis; and
foldable frame means for supporting the rod attachment means and the attached fishing rod above a supporting surface, the frame means pivotably and removably couplable to the rod attachment means via first and second ends of the pivot axis means, the foldable frame means configured to allow pivoting of the fishing rod about the pivot axis during fishing and to allow removal of the rod attachment means and the attached fishing rod as a unit from the frame means.

11. The apparatus of claim 10, wherein the pivot axis means includes a pivot rod and the means for selectively adjusting and locking the pivot axis means includes first and second members that respectively engage the pivot rod on opposing sides of the body of the rod attachment means.

12. The apparatus of claim 11, wherein the pivot rod includes a threaded portion and wherein at least one of the first and second members is a threaded fastener.

13. The apparatus of claim 10, wherein the rod attachment means includes means for adjusting its center of gravity.

14. The apparatus of claim 10, wherein each of the first and second straps includes a hook or loop material for respective hook-and-loop engagement with the first and second ends of the elongated structure.

* * * * *